UNITED STATES PATENT OFFICE.

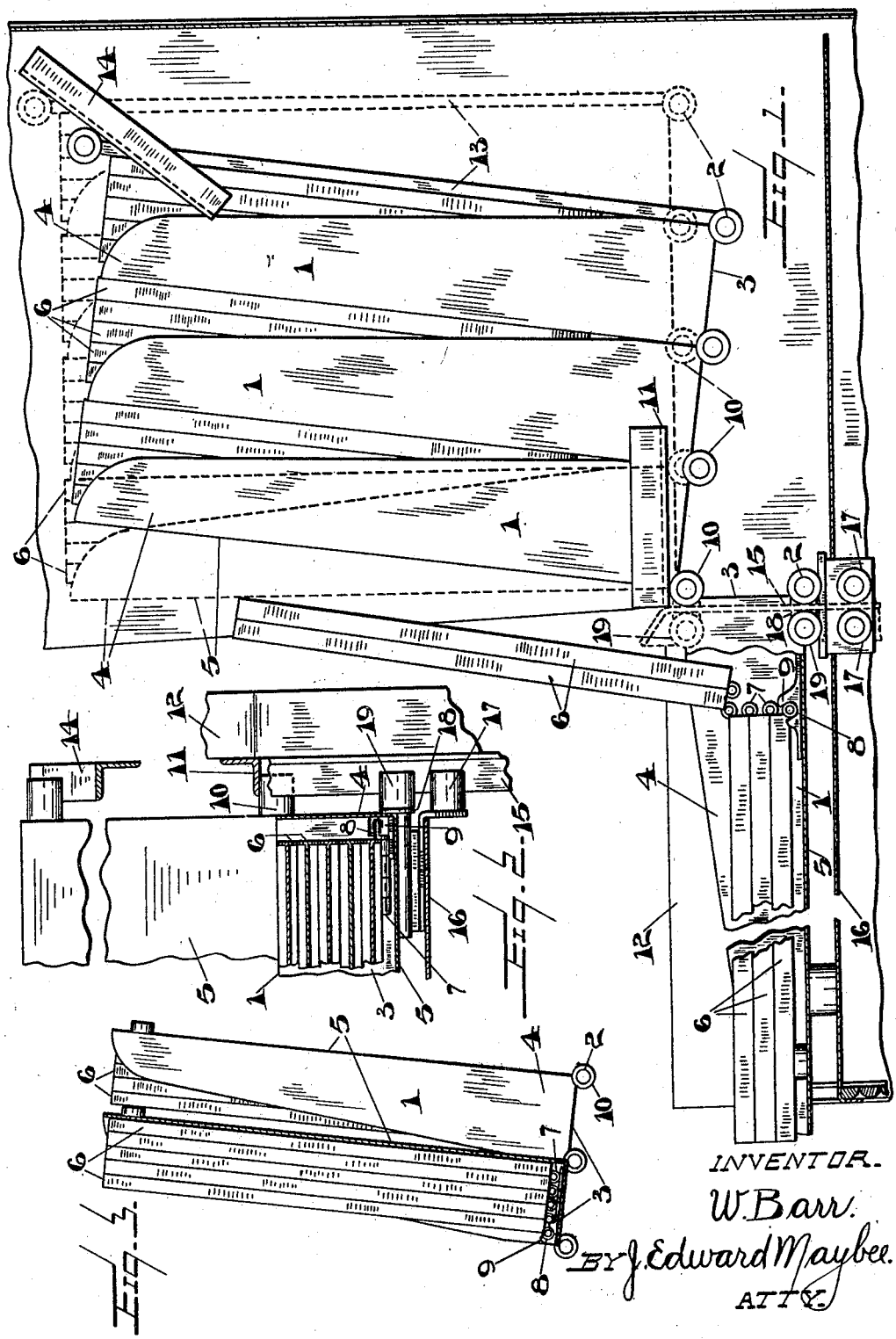

WILSON BARR, OF TRENTON, ONTARIO, CANADA.

ACCOUNT-FILE.

1,395,892. Specification of Letters Patent. Patented Nov. 1, 1921.

Application filed March 29, 1920. Serial No. 369,742.

*To all whom it may concern:*

Be it known that I, WILSON BARR, of Trenton, in the county of Hastings, Province of Ontario, Canada, have invented certain new and useful Improvements in Account-Files, of which the following is a specification.

This invention relates to improvements in account files of the type shown and described in my prior United States Patent No. 996197 of June 27th, 1911, and my co-pending application No. 362152 filed Feb. 28th, 1920, in which a series of frames hinged together in the form of a book are supported in a casing so that they may be turned up or down on horizontal axes to expose either side of each leaf.

In such files much trouble is experienced due to the fact that to secure large capacity within moderate dimensions it is necessary to make the leaves as thin as possible, which necessarily involves the use of small hinges which it is very difficult to make sufficiently strong and durable without the use of specially selected materials, the most careful workmanship and rigid inspection, and, of course, the difficulty increases in proportion to the number of leaves employed.

In the present invention I aim to provide a construction which will enable all hinges exposed to great strain to be made as large as may be desirable while the leaves themselves may be made of even less weight and thickness than is now usual.

I attain my object by dividing the leaves into a plurality of sections each comprising a plurality of leaves hinged together, each section being hinged on a tray or carrier, the carriers being so supported that each carrier may occupy either an upright or a substantially horizontal position, and the sections arranged so that each leaf therein may, when its carrier is suitably positioned, be swung to either an upright or a substantially horizontal position.

The invention is hereinafter more fully described and is illustrated in the accompanying drawings in which—

Figure 1 is a side elevation of part of an account file, partly broken away and partly in section, showing my improved construction;

Fig. 2 a front view, partly broken away, of some of the parts shown in Fig. 1; and Fig. 3 a side elevation, partly in section, illustrating a modified form of the carriers and leaves supported thereby.

In the drawings like numerals of reference indicate corresponding parts in the different figures.

Referring particularly to Figs. 1 and 2, 1 are carriers which are connected at their lower corners by means of the hinges 2. In their preferred form, the carriers are substantially L-shaped, the hinges connecting the carriers being located at the corners of the lower legs of the L's. Each carrier preferably comprises a bottom 3, sides 4 and back 5, all connected or formed integral with one another as indicated. The carriers are each adapted to contain a plurality of account-holding leaves 6, which are mounted on the carriers so that each leaf may be turned from an upright to a substantially horizontal position and vice versa. In the construction shown in Figs. 1 and 2, I show the leaves as connected at their lower edges, by hinges 7, while the front leaf, by means of pins 8, is journaled in open bearings 9 secured to the carrier. The leaves in each carrier thus form a section which may be readily removed and placed in a vault or other place of safety whenever desired. In the construction shown in Figs. 1 and 2, in which the back 5, when brought to a horizontal position, underlies the leaves supported by the carrier of which it forms a part, the open bearings are secured to the back some distance from the bottom 3, so as to permit of all the leaves supported therefrom occupying the upright position while the back is substantially horizontal. It is, however, possible to arrange the back 5 so that it is in the upright position when the leaves of that particular carrier are being used. In this case the open bearings are formed on the bottom 3 as shown in Fig. 3. In each arrangement it will be seen that the backs 5 serve as supports for the leaves when the latter are either upright or horizontal, in one case, the leaves when horizontal being supported by the back of their own carrier, and in the other case by the back of an adjacent carrier, while when the leaves are upright they in one case lie against the back of an adjacent carrier and in the other case against the back of their own carrier.

The carriers, it will be understood, may be supported in any desired way provided they are mounted so that each may be turned from an upright position to a substantially horizontal position or vice versa. I prefer, however, to arrange the carriers so that they may be operated in exactly the same manner as the leaves in existing account files, such, for example, as the file shown and described in the United States patent or the pending application heretofore referred to.

In the drawings I show the carriers arranged for operation substantially in the manner set forth in the application referred to. The hinge of each carrier is provided with a projection 10, preferably a roller, which rollers are adapted to engage beneath tracks or restraining bars 11 supported one at each side of a casing 12. Behind the last carrier is located a back 13 hinged to the last carrier and provided at its upper end with projections 20 adapted to rest against the supports 14 connected to the casing at each side. When the carriers are brought to a horizontal position, their projections 10 ride behind vertical tracks 15 supported one at each side of the casing, and the carriers rest on the table 16 guided by rollers 17 engaging at each side of the track 15. This table will be resiliently supported in any suitable manner, but such devices form no part of the present invention.

To prevent rearward displacement of any carrier when it is in a horizontal position, I secure to the front and lower corner thereof at each side a link 18 carrying a projection 19 adapted to lie in front of the track 15. The carriers may thus be swung from the horizontal to the upright position substantially in the manner of the single leaves of the application hereinbefore referred to. Normally the carriers, when all up, may be inclined somewhat forwardly, though this is not essential, and naturally when all carriers are in horizontal position except the last, this carrier will be considerably inclined rearwardly. It may be, preferable therefore to incline the supports 14 so that as the last leaf comes forwardly, it rides down on the supports 14 and at its upper end is pushed somewhat to the front to partially compensate for the forward travel of the lower end thereof. There is even with this arrangement a constant alteration of the angle to the vertical of each fresh carrier as it is brought to the front, which, however, is not objectionable if not too exaggerated.

With this arrangement, it will be seen, that as all the strain of the supports of the leaves as a whole comes upon the carriers and their parts, and as these may be made amply strong, the leaves themselves and their hinges may be made very much lighter than has heretofore been possible without sacrificing strength and durability. Further, as each section of the leaves is of moderate size and is independently removable, all the account holding leaves of a very large file may be removed and placed in a place of safety with a minimum of exertion.

What I claim as my invention is:—

1. In an account file the combination of a plurality of carriers one behind another, each mounted so that it may be turned from an upright to a substantially horizontal position and vice versa; and a plurality of account holding leaves mounted on each carrier one behind another, each adapted to be turned from an upright to a substantially horizontal position and vice versa.

2. An account file constructed as set forth in claim 1 in which the carriers are hinged together at their lower corners.

3. An account file constructed as set forth in claim 1 in which the carriers are hinged together at their lower corners, the leaves of each carrier hinged together to form a book or section and an end leaf of each section pivotally supported on its carrier.

4. An account file constructed as set forth in claim 1 in which the leaves of each carrier are hinged together to form a book or section and an end leaf of each section pivotally supported on its carrier.

5. In an account file the combination of a plurality of L-shaped carriers; hinges connecting the carriers at the corners of the lower legs of the L's; a plurality of account holding leaves forming a section mounted on each carrier one behind another, each adapted to be turned from an upright to a substantially horizontal position and vice versa, the free legs of the L-shaped carriers being adapted to be engaged by the front leaf of one section and the last leaf of the adjacent section to support the leaves when either upright or horizontal.

6. An account file constructed as set forth in claim 5 provided with a pin projecting laterally from each hinge at each side of the carriers.

Signed at Hamilton, Ontario, this sixteenth day of March, 1920.

WILSON BARR.